United States Patent [19]

Larsen

[11] Patent Number: 5,054,909

[45] Date of Patent: Oct. 8, 1991

[54] LAMP HOUSING FOR MOTION PICTURE FILM PROJECTOR

[75] Inventor: Steinar A. Larsen, Los Angeles, Calif.

[73] Assignee: Christie Electric Corp., Torrance, Calif.

[21] Appl. No.: 619,932

[22] Filed: Nov. 26, 1990

[51] Int. Cl.⁵ ............................................. G03B 21/00
[52] U.S. Cl. .................... 352/198; 362/372; 362/419
[58] Field of Search ................. 352/198; 362/372, 419

[56] References Cited

U.S. PATENT DOCUMENTS 1,000,964  8/1911  Crosier ................................ 362/372
1,270,269  6/1918  Davis .................................. 362/372

Primary Examiner—Monroe H. Hayes
Attorney, Agent, or Firm—Harris, Kern, Wallen & Tinsley

[57] ABSTRACT

A lamp housing for a motion picture projector which provides for moving the projection lamp forward and backward, up and down, and side to side, for changing the position of the lamp with respect to the focusing reflector and the film aperture. A control for automatically setting the lamp at two preselected focusing locations. Manual adjustment for moving the lamp in all three directions and remote electrical control means for moving the lamp in all three directions.

10 Claims, 5 Drawing Sheets

SIDE

TOP

REAR

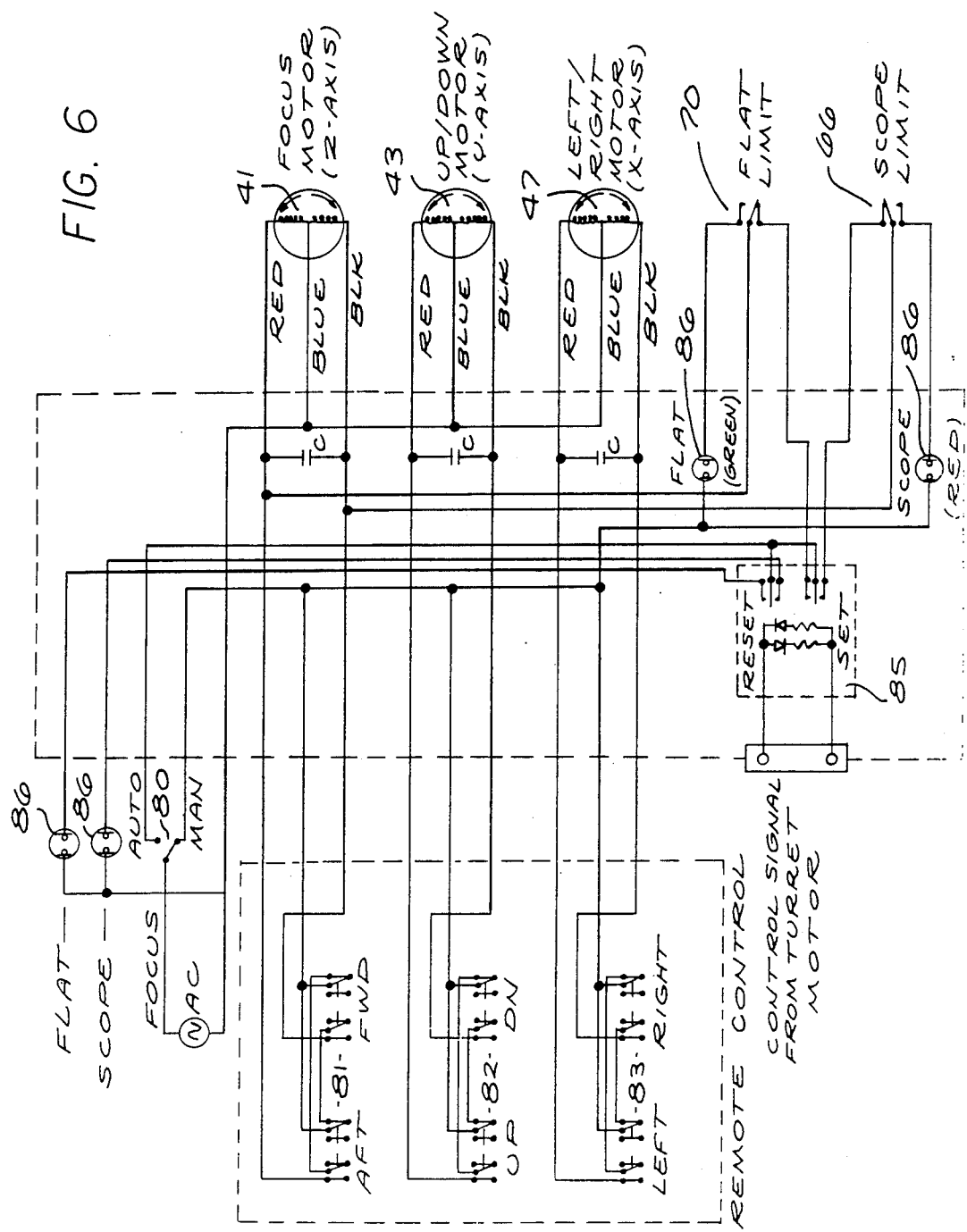

TOP

SIDE

LAMP HOUSING FOR MOTION PICTURE FILM PROJECTOR

BACKGROUND OF THE INVENTION

This invention relates to motion picture film projectors of the type used in motion picture theaters. In a typical installation, the film projector is mounted on a console and carries a lens turret and one or more motors for changing lenses and film aperture. The console which carries the projector includes the projection lamp, reflector, heat filter, lamp power supply, optical system and control panel.

Various aperture shapes are used in present day film. In one arrangement, two apertures are used; typically one shape is nearly square and is sometimes referred to as the Cinemascope or "scope" aperture. The other is rectangular with a side-to-side ratio of about 1.85 to 1, and sometimes is referred to as the "flat" aperture. The two types of film often are spliced together for continuous showing and cues are incorporated at the splices to provide control signals to the lens change and aperture change motors so that the projector is properly configured for the particular film being shown.

The beam of light from the high intensity lamp is circular and therefore some lamp energy is blocked at each of the apertures. Reflectors providing elliptical beams have been tried but have not been satisfactory. Since the projector apertures have different length to width ratios, it is the practice to focus the beam to a size which is a compromise between the sizes preferred for each of the two apertures. Alternatively, the projector operator can manually change the focus. However, changing focus is not a practical solution to the problem because an operator is not present in the projection booth at all times in today's theatres.

It is an object of the present invention to provide a new and improved lamp mounting arrangement which will provide for automatically changing the lamp position and thereby the lamp focus and beam shape to achieve maximum efficiency for each of the aperture shapes. A further object is to provide such a system which will utilize the control signals from the film cues for automatically changing the lamp position as the type of film being projected changes.

These and other objects, advantages, features and results will more fully appear in the course of the following description.

SUMMARY OF THE INVENTION

A film projection lamp, normally a Xenon short-arc lamp, is mounted in a housing at its forward end and at its rear end, with the lamp forward end sliding and with the lamp rear end being driven. A first carrier is mounted on the housing for movement in a first lateral direction, and a second carrier is mounted on the first carrier for movement in a second lateral direction. A third carrier is mounted on the second carrier and supports the lamp at the rear end. Means are provided for moving the lamp along its longitudinal axis and in both lateral directions relative to the reflector in the housing for focusing and aiming the beam from the lamp.

In the preferred embodiment, electrical motors are provided for moving the lamp in each of the three directions, with manually operable remote switches for lamp adjustment and another switch controlled by the film cues for moving the lamp between two predetermined positions for automatic change of focus to match the two aperture shapes. Manual control wheels or knobs may be incorporated for direct manual adjustment of lamp position.

BRIEF DESCRIPTION OF THE DRAWINGS

FIG. 6 is an electrical schematic of the preferred circuit for operating the apparatus of the invention.

DESCRIPTION OF THE PREFERRED EMBODIMENT

Figure 1:
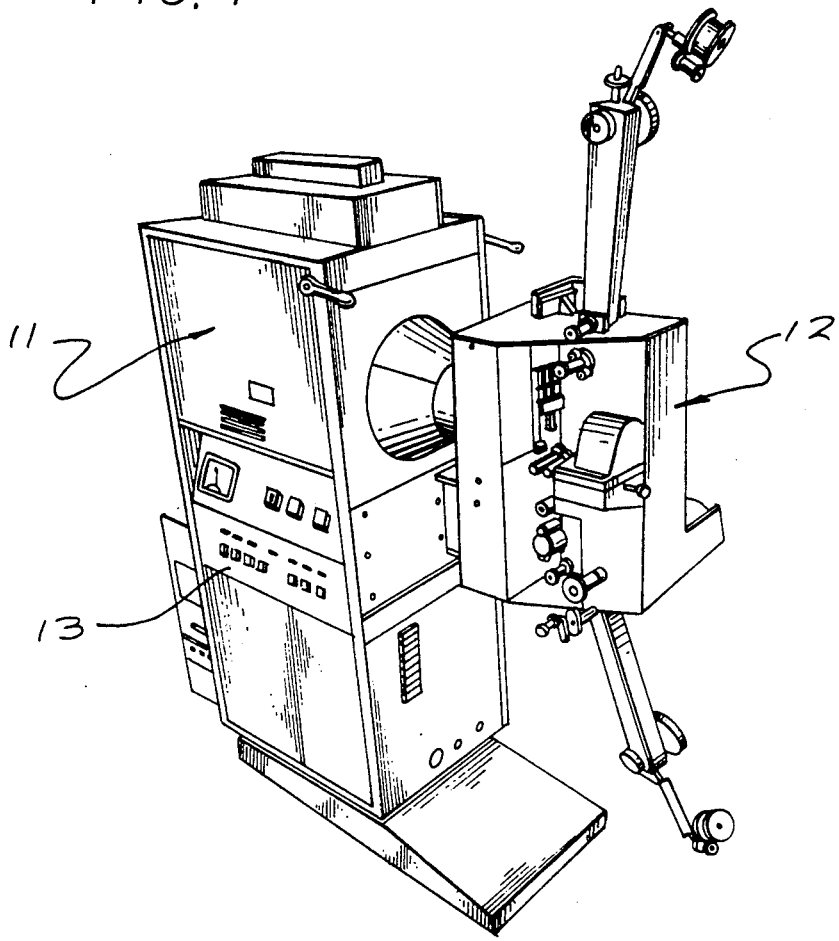
FIG. 1 is a perspective view of a typical console with a film projector mounted thereon and with the lamp mounted within the console housing.
Figure 2:
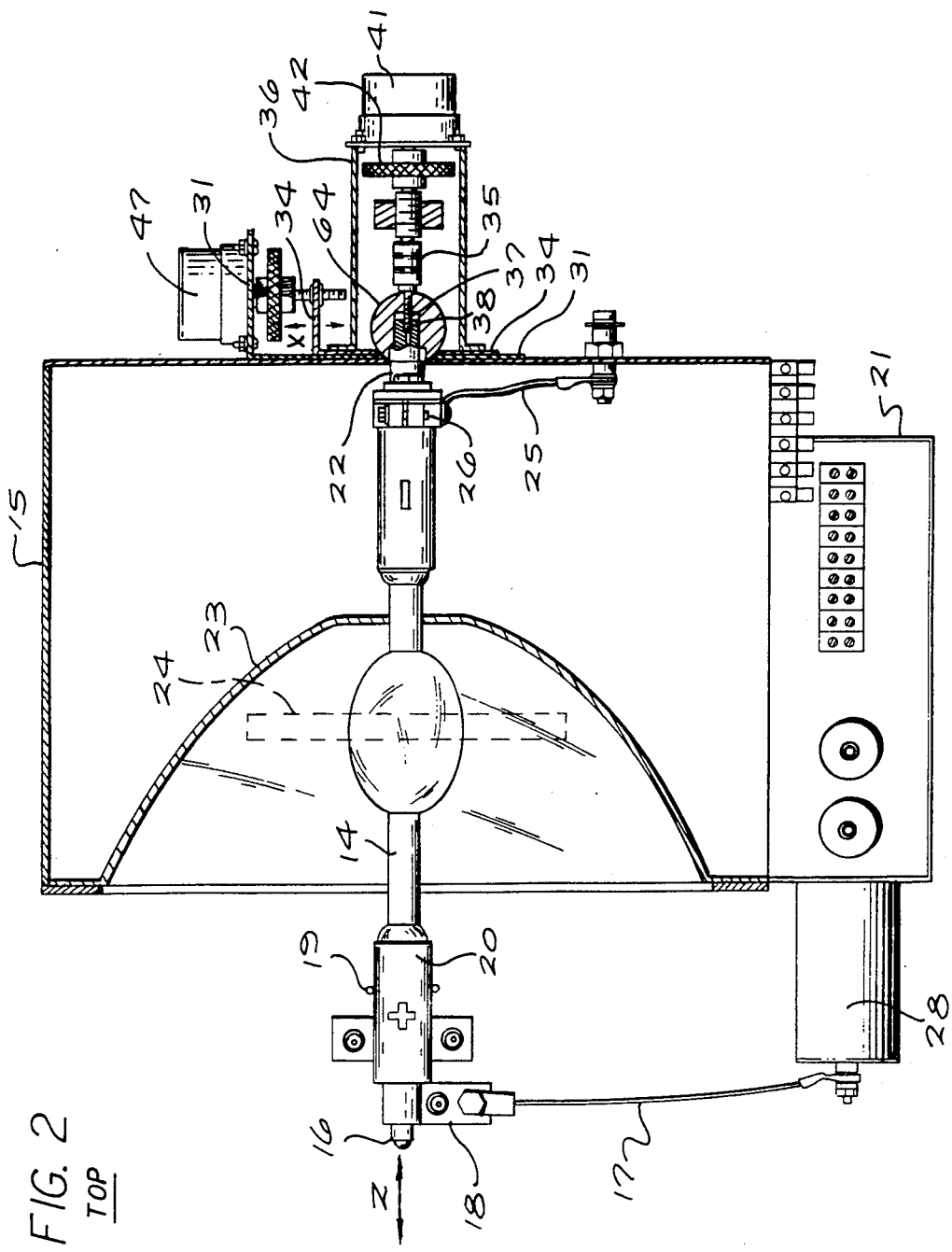
FIG. 2 is a top view, partly in section, of the lamp in the housing in the console, and incorporating the presently preferred embodiment of the invention.

Referring to FIG. 1, a motion picture projector console 11 has a projector 12 mounted on the front and a control panel 13 mounted on the side. A high intensity lamp 14 is mounted in a housing 15 within the console. High voltage power is connected to the forward end 16 of the lamp by a lead 17 and a clamp 18. The forward end of the lamp is supported by a yoke 19 engaging an insulator 20, with the lamp being slidable in the yoke along its longitudinal axis, indicated as the Z axis in FIG. 2. The rear end 22 of the lamp passes through a reflector 23, and a magnet 24 is positioned below the lamp for arc stablization. An electrical ground connection is provided between the lamp and the housing at the rear end of the lamp by a lead 25 and a clamp 26. The lamp power supply includes an ignitor circuit 27 and a high frequency transformer 28.

Figure 3:
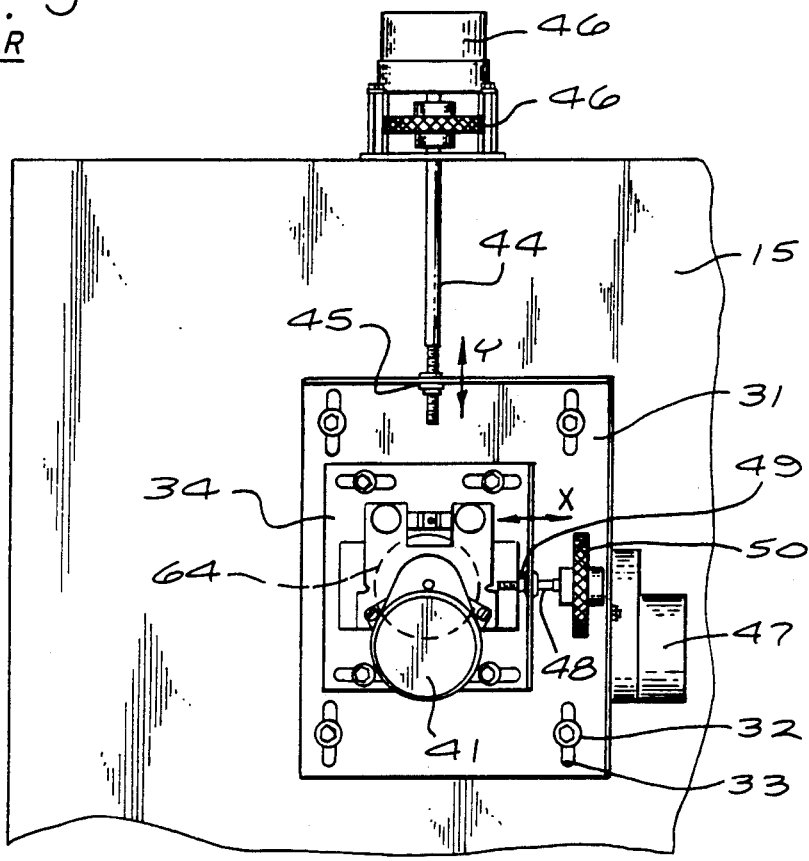
FIG. 3 is a rear end view of the apparatus of FIG. 2.

As seen in FIG. 3, a carrier plate 31 is mounted on the housing 15 for motion in a first lateral direction, here shown as up and down and designated as the Y axis. The carrier plate 31 is mounted on the housing 15 by screws 32 which ride in slots 33 in the carrier plate. Another carrier plate 34 is similarly mounted on the carrier plate 31, with the carrier plate 34 moving laterally in a second direction, here shown as side-to-side along an X axis.

A rotating shaft 35 is carried in bracket 36 mounted on the carrier plate 34. The forward end 37 of the shaft 35 is threaded and is positioned in a threaded nut 38 at the rear end 22 of the lamp. Rotation of the shaft 35 moves the lamp along its longitudinal or Z axis. The shaft 35 is driven by a gear reduction motor 41 mounted on the bracket 36. A thumb wheel 42 is mounted on the shaft to provide for manual rotation of the shaft and thereby manual adjustment of the position of the lamp along the Z axis. In the preferred embodiment, the three axes of motion X, Y and Z, are perpendicular to each other providing for movement of the rear end of the lamp in any direction.

The carrier plate 31 is moved along the Y axis by another gear reduction motor 43 mounted on the housing, with the motor driving a threaded shaft 44 which engages a nut 45 on the carrier plate 31. A thumb wheel 46 on the shaft 44 permits manual adjustment of the carrier plate 31 along the Y axis. The carrier plate 34 is similarly moved along the X axis by another gear reduction motor 47 which drives a threaded shaft 48 in a nut 49 carried by the plate 44. A thumb wheel 50 is mounted on the shaft 48.

Figure 5:
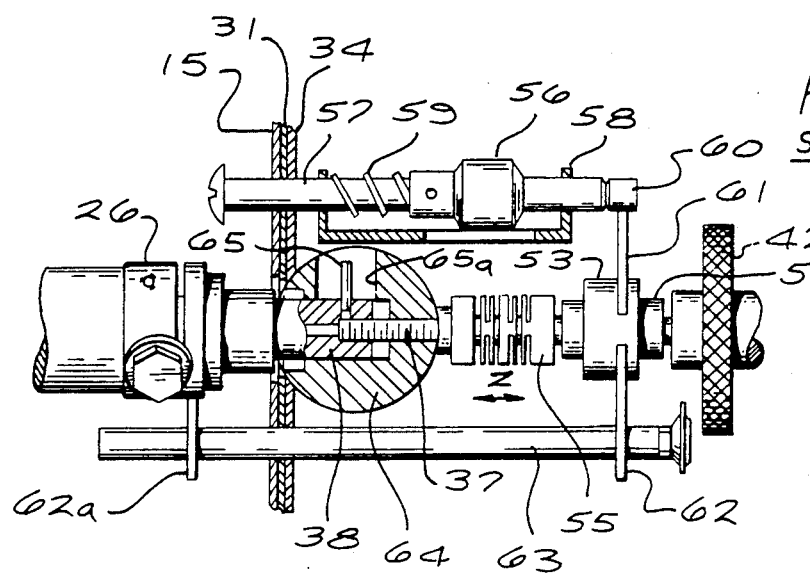
FIG. 5 is an enlarged side view taken along the line 5—5 of FIG. 4.
Figure 4:
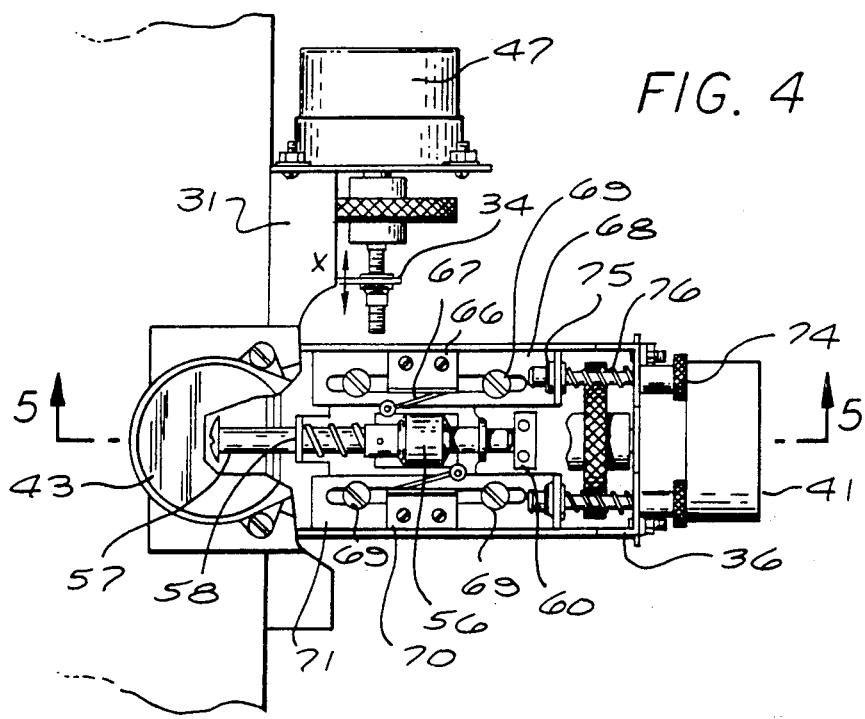
FIG. 4 is an enlarged partial top view showing the limit switch construction.

A limit switch arrangement for limiting motion along the Z axis is shown in FIGS. 4 and 5. A nut 53 rides on a threaded section of the shaft 35 so that the nut moves along the Z axis when the shaft rotates. A flexible coupling 55 is positioned between the two portions of the shaft 35 to relieve stress on the lamp. A cam 56 is carried on a pin 57 which rides in a bracket 58. A spring 59 between the cam and the left end of the bracket pushes the pin 57 against a block 60 carried on an arm 61 mounted on the nut 53. An arm 62 is carried on the nut 53 and a similar arm 62a is carried at the clamp 26 on the lamp. These arms have U-shaped lower ends which ride on a guide rod 63 thereby preventing rotation of the nut 53 and the lamp 14 as the shaft 35 rotates.

Figure 8:
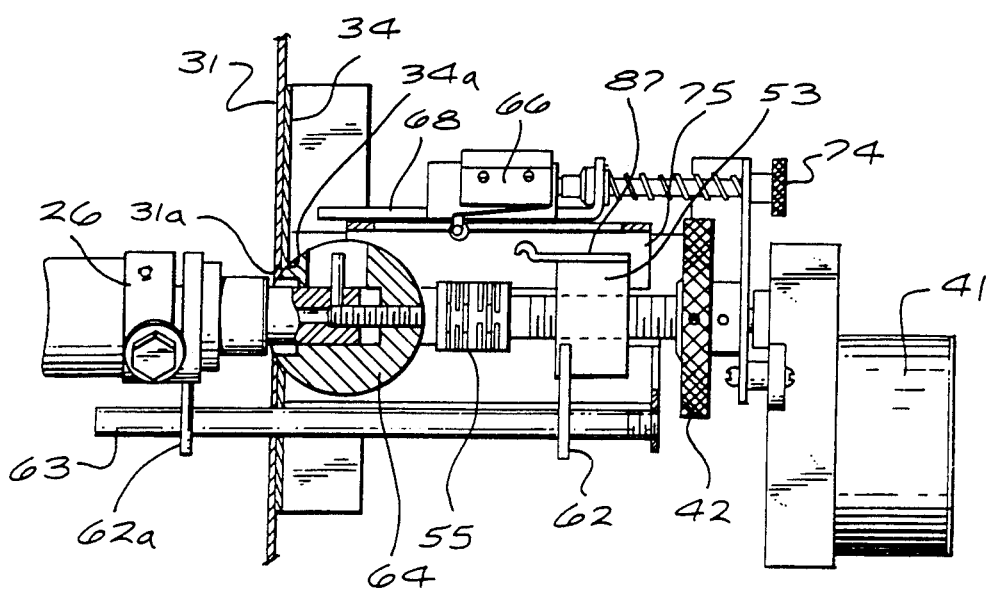

The nut 38 slides in a block 64 having a spherical forward end, which block typically is formed of molded plastic in a generally spherical shape. A guide pin 65 projects from the nut 38 and rides in a slot 65a in the block for limiting rotation of the nut. The forward end of the block is centered in a circular opening 34a in the plate 34 such that the forward end of the block moves with the movements of the plates 31 and 34. There is a clearance opening for the lamp end in the housing 15 and a clearance opening 31a in the plate 31 for the block 64. The openings 31a and 34a are best seen in FIG. 8. While a spherical forward end is shown for the block 64, other shapes may be utilized.

A switch 66, typically a micro switch with an actuating lever 67, is mounted on a plate 68 which in turn is slidably mounted on the bracket 36 by screws 69 passing through a slot in the plate 68. Another switch 70 is similarly mounted on another plate 71.

The position of each switch relative to the bracket 36 is adjustable. An adjustment screw 74 carried in the bracket 36 rides in a nut 75 carried on the plate 68. The screws 69 are loosened and then the screw 74 is rotated to move the switch plate. A spring 76 is carried on the screw 74, urging the plate 68 to the left. A similar arrangement is provided for the switch 70. The switch 66 is positioned so that it will be actuated by the cam 56 when the lamp is moved forward to a predetermined position. Similarly, the switch 70 is positioned so that it will be actuated by the cam when the lamp has moved rearly to a predetermined position. These two predetermined positions correspond to the desired focuses for the two apertures.

A control circuit for the three motors is shown in FIG. 6. AC power is connected to a focus switch 80. When the focus switch is set to manual (MAN), power is provided to manual switches 81, 82 and 83. Switch 81 permits the operator to drive the Z axis motor 41 to a desired position, switch 82 permits the operator to drive the Y axis motor 43 to a desired position, and switch 83 permits the operator to drive the X axis motor 47 to any desired position.

When the focus switch 80 is set to automatic (AUTO), power is provided to a relay 85 which provides power to the Z axis motor 41 through the limit switches 66, 70. The relay 85 is energized by a control signal from the film cue. The relay 85 is a set-reset relay which switches to the set condition for one polarity of signal and to the reset position for the opposite polarity of signal. Indicator lamps 86 provide visual indication of the aperture for which the lamp is positioned.

When the operator desires to set the lamp position manually, this can be done at the housing by rotating the thumb wheels. This also can be carried out remote from the housing, typically at the control of the console, by actuating the switches 81, 82 and 83, with the switch 80 moved to the manual position.

When it is desired to have the system automatically change focus between the flat aperture and the scope aperture positions, the two limit switches are adjusted to the desired positions and the switch 80 is moved to automatic. When a cue control signal for flat aperture is received, the relay 85 is energized to power the focus motor 41 and move the lamp rearward along the Z axis until the limit switch 70 is actuated. Similarly, when a cue control signal for scope aperture is received, the relay 85 is energized to power the motor 41 in the reverse direction, moving the lamp forward until the scope limit switch 66 is actuated.

With the construction described, the operator has manual control over the lamp position in all directions as well as automatic control for switching between two predetermined focus positions.

Figure 7:
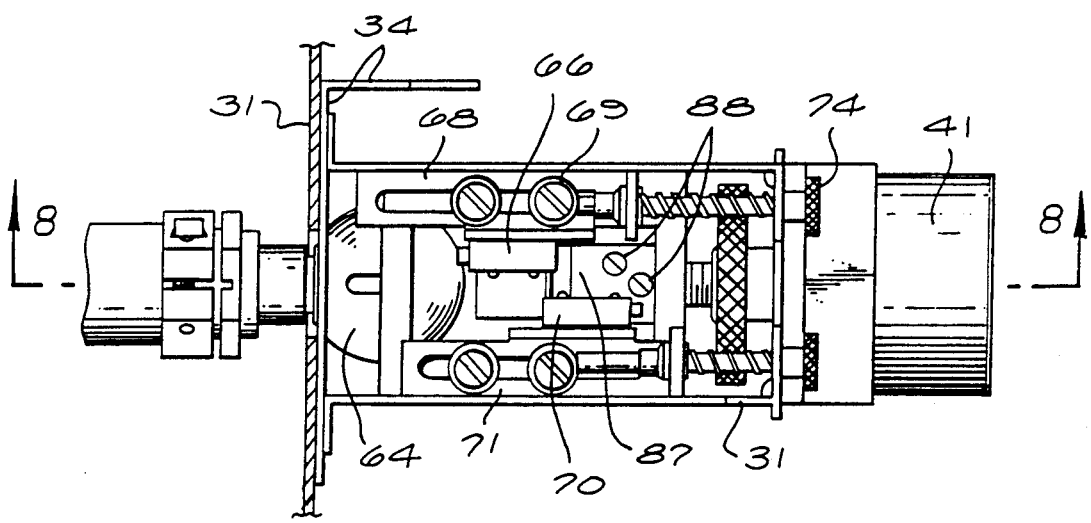
FIGS. 7 and 8 are views similar to FIGS. 4 and 5, respectively, showing an alternative and presently preferred embodiment of the limit switch configuration.

FIGS. 7 and 8 show an alternative construction for the limit switch mounting, where components corresponding to those of FIGS. 4 and 5 are identified by the same reference number. The cam 56 is replaced by a cam arm 87 mounted on the nut 53 by two screws 87. The switches 66, 70 are turned 90 degrees so that both are above the cam arm 87. The operation of the embodiment of FIGS. 7 and 8 is the same as described for FIGS. 4 and 5

I claim:

1. In a lamp housing for a motion picture projector, said lamp having a longitudinal axis with a forward end and a rear end, the combination of:
   forward means for supporting said lamp adjacent said forward end;
   rear means for supporting said lamp adjacent said rear end for motion along said longitudinal axis and for motion in first and second lateral directions, said rear means including
   a first carrier mounted on said housing for movement in said first lateral direction,
   a second carrier mounted on said first carrier for movement in said second lateral direction, and
   a third carrier mounted on said second carrier and including means for connection to said lamp,
   said third carrier including a motor for moving said lamp along said longitudinal axis; and
   a motor control circuit connected to said third carrier motor and having relay means for selectively powering said third motor to move said lamp in forward and reverse directions in response to a control signal.

2. A lamp housing as defined in claim 1 wherein said third carrier includes adjustable limit switch means connected in said control circuit for limiting power to said third motor and movement of said lamp.

3. A lamp housing as defined in claim 2 wherein said limit switch means includes forward and reverse switches, each having an actuating lever,
   a cam positioned for engaging said actuating levers, and
   means for moving said cam as said lamp is moved.

4. A lamp housing as defined in claim 3 wherein said third carrier means for connection includes a block for supporting said lamp rear end, with said block having a forward end facing said lamp, and wherein said second carrier includes means defining an opening for receiving said block forward end.

5. A lamp as defined in claim 3 including first means for changing the position of said forward switch relative to said cam, and second means for changing the position of said reverse switch relative to said cam independently of said forward switch.

6. A lamp housing as defined in claim 3 wherein said motor control circuit includes remote switch means manually actuable for powering said third motor to move said lamp in forward and reverse directions.

7. A lamp housing as defined in claim 6 wherein said third carrier includes a manually rotatable member for moving said lamp in forward and reverse directions.

8. A lamp housing as defined in claim 1 wherein said first carrier includes a motor for moving said first carrier in said first lateral direction, and said second carrier includes a motor for moving said second carrier in said second lateral direction.

9. A lamp housing as defined in claim 8 wherein said control circuit includes remote switch means for selectively powering each of said motors to selectively move said lamp along said longitudinal axis, along said first lateral direction, and along said second lateral direction.

10. A lamp housing as defined in claim 9 wherein each of said carriers includes a manually rotatable member for moving said first carrier in said first lateral direction, said second carrier in said second lateral direction, and said lamp along said longitudinal axis, respectively.

* * * * *